United States Patent [19]
>
> Wandel

[11] Patent Number: 4,502,283
[45] Date of Patent: Mar. 5, 1985

[54] TURBOCHARGED ENGINE DRIVEN POSITIVE DISPLACEMENT BLOWER HAVING A BYPASS PASSAGE

[75] Inventor: David M. Wandel, Farmington Hills, Mich.

[73] Assignee: General Motors Corporation, Detroit, Mich.

[21] Appl. No.: 422,892

[22] Filed: Sep. 24, 1982

[51] Int. Cl.³ .............................................. F02B 37/04
[52] U.S. Cl. ..................................... 60/609; 123/564; 417/253; 417/310
[58] Field of Search ........................ 60/609, 611, 610; 123/564; 417/301, 310, 253

[56] References Cited

U.S. PATENT DOCUMENTS

| | | | |
|---|---|---|---|
| 1,826,638 | 10/1931 | Schwerdtfeger | 123/564 |
| 2,509,958 | 5/1950 | Burn | 417/301 X |
| 3,128,710 | 4/1964 | Blomgren et al. | 417/310 |
| 3,255,700 | 6/1966 | Keller et al. | |
| 3,335,563 | 8/1967 | Kitchen | 60/610 |
| 3,355,879 | 12/1967 | Smith et al. | 60/609 |
| 3,373,689 | 3/1968 | Brunson | 417/310 |
| 3,568,435 | 3/1971 | May | 60/611 |
| 3,667,874 | 6/1972 | Weatherson et al. | |

Primary Examiner—Michael Koczo
Attorney, Agent, or Firm—Robert J. Outland

[57] ABSTRACT

A turbocharged internal combustion engine, preferably of the two-stroke cycle type, is provided with a Roots type positive displacement charging blower having a bypass passage in one end plate and controlled by a single plunger control valve responsive solely to blower outlet pressure to provide for bypassing air flow around the blower under various engine operating conditions either in reverse direction to reduce excess blower power or in the direction of flow to provide additional charging air.

5 Claims, 7 Drawing Figures

4,502,283

TURBOCHARGED ENGINE DRIVEN POSITIVE DISPLACEMENT BLOWER HAVING A BYPASS PASSAGE

TECHNICAL FIELD

This invention relates to internal combustion engines and more particularly to intake air supply systems for turbocharged engines having a positive displacement blower. In certain more particular aspects, the invention relates to a bypass blower arrangement for use in the induction system of a turbocharged two-stroke cycle diesel engine.

BACKGROUND

The use of Roots type positive displacement blowers to supply charging air to the cylinders of two-stroke cycle diesel engines and the like has been well known for many years. Further it is known to provide such engines with an exhaust driven turbocharger which increases the charge at the high end of the engine operating load range by compressing air supplied to the blower inlet before it is forced by the blower into the engine cylinders, with or without cooling.

The prior art also proposes various arrangements for improving operating efficiency of such systems through bypassing of a portion of the charging air around the blower. Such bypassing may be used either in the reverse direction to reduce the blower pumping load or in the direction of flow to reduce the restriction of the blower to the supplying of additional charging air by the turbocharger. Such arrangements have added varying degrees of complexity to the blower or the associated intake air supply system and have, in some cases, been controlled by the different pressure across the blower.

SUMMARY OF THE INVENTION

The present invention involves a bypass blower arrangement for a turbocharged engine, especially a two-stroke cycle diesel engine, in which a single compact bypass valve mounted in the blower end plate controls a bypass passage in the blower end plate and connects the blower inlet and outlet zones. The valve is operable solely in response to the elevation of blower outlet pressure above the ambient condition to open the bypass and allow the passage of air in either direction around the blower impellers, either to reduce blower power or to increase engine charging air as conditions warrant.

These and other features and advantages of the invention will be more fully understood from the following description of a preferred embodiment taken together with the accompanying drawings.

BRIEF DRAWING DESCRIPTION

DETAILED DESCRIPTION

Figure 1:
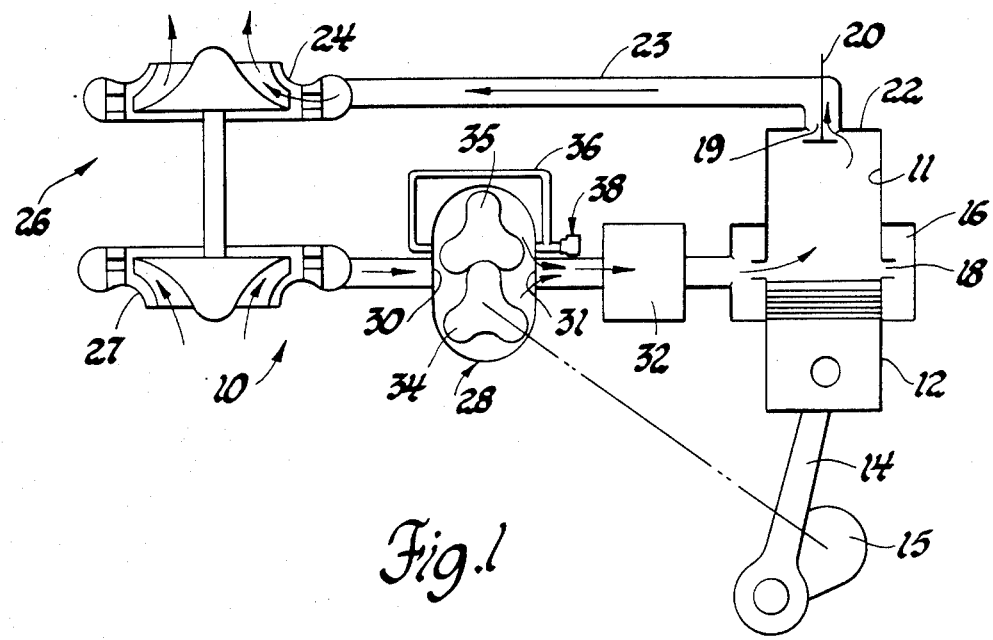
FIG. 1 is a schematic view of a two-stroke cycle turbocharged and aftercooled diesel engine having a Roots blower with bypass means in the intake air supply system in accordance with the invention.
Figure 2:
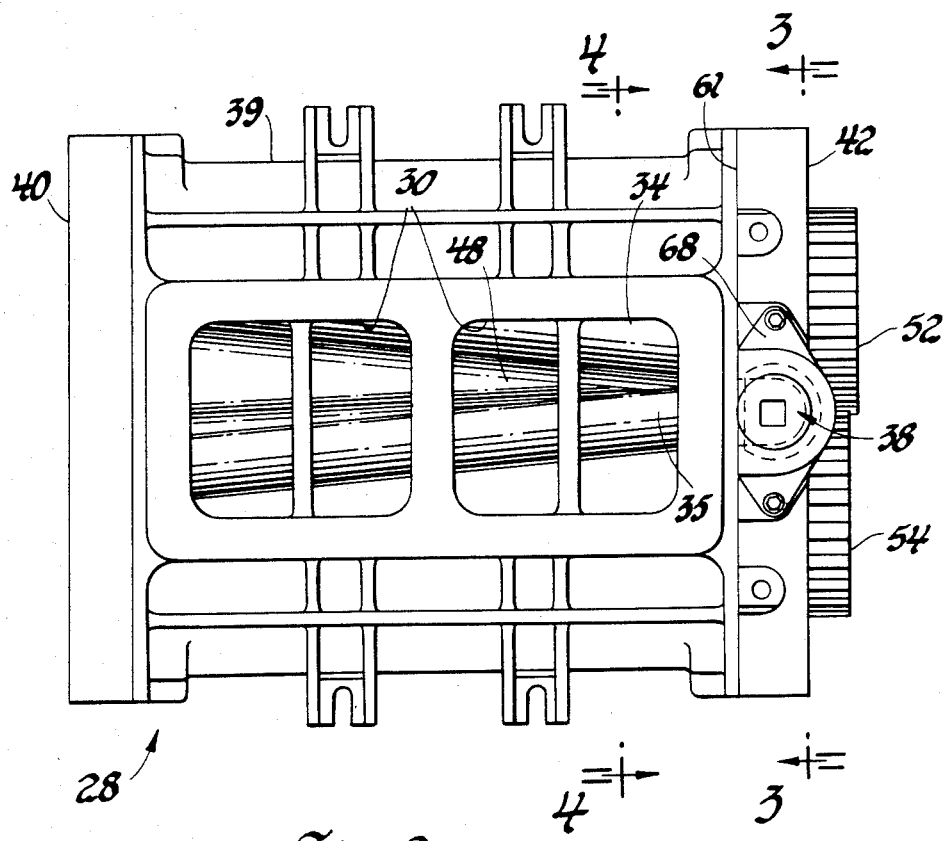
FIG. 2 is a plan view of a Roots blower with end plate mounted bypass valve and passage in accordance with the invention.
Figure 3:
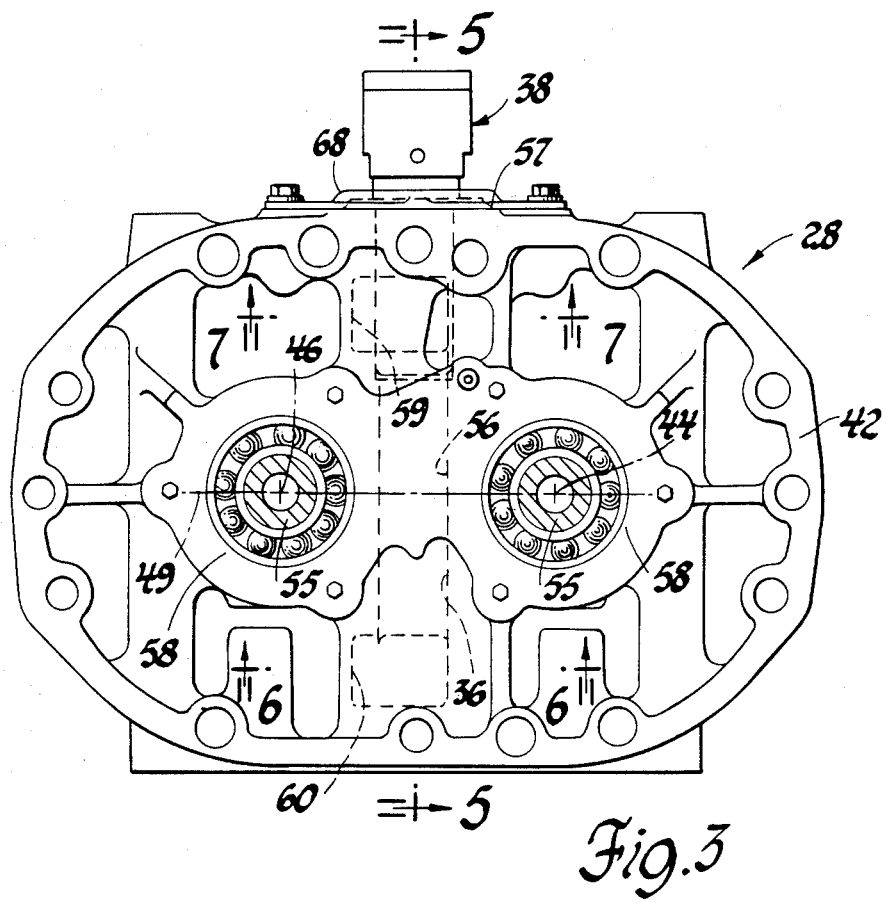
FIG. 3 is a rear end view of the blower housing from the plane indicated by the line 3—3 of FIG. 2.
Figure 4:
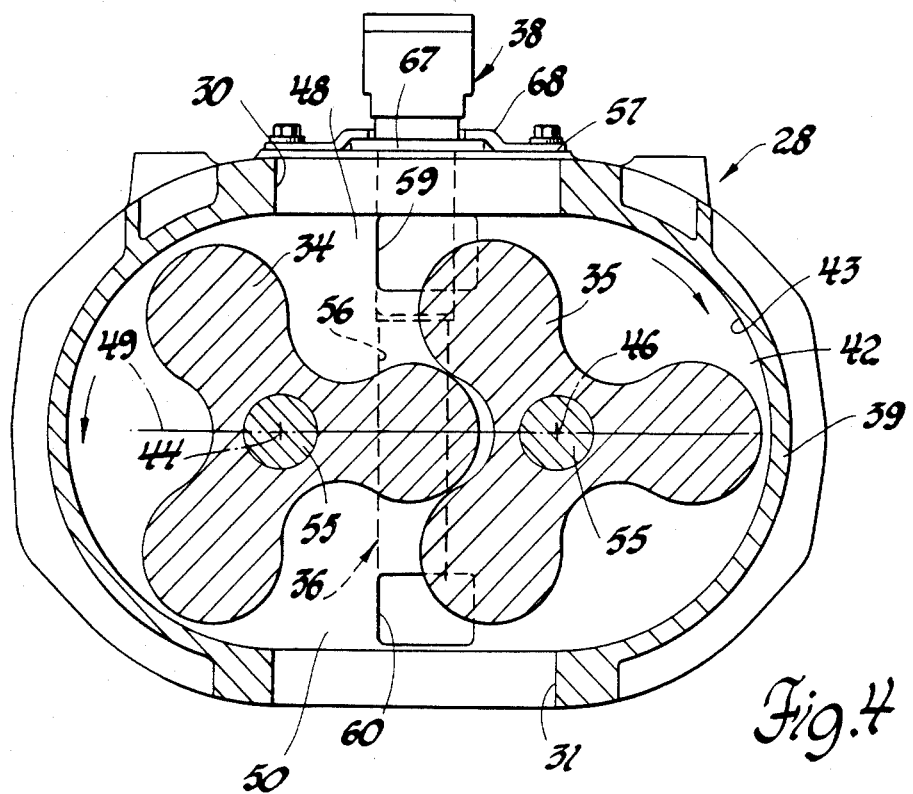
FIG. 4 is a transverse cross-sectional view through the blower from the plane indicated by the line 4—4 of FIG. 2.
Figure 5:
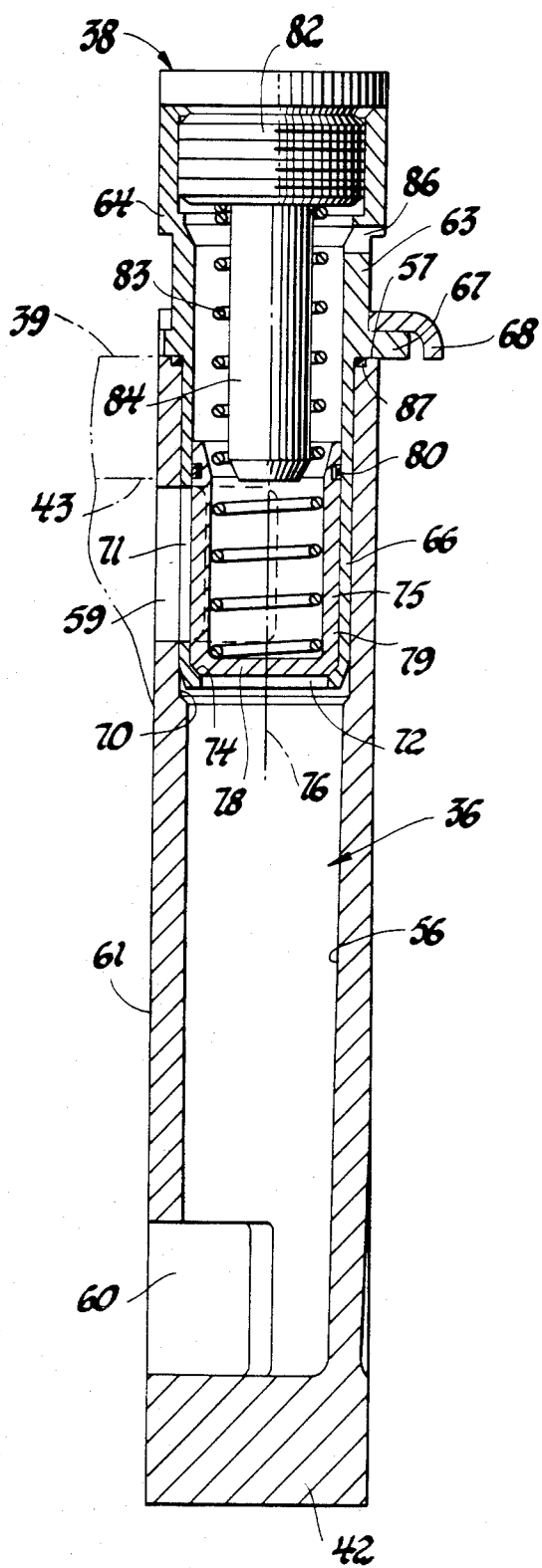
FIG. 5 is a fragmentary longitudinal cross-sectional view through the bypass and control valve portion of the blower from the plane indicated by the line 5—5 of FIG. 3.
Figure 6:
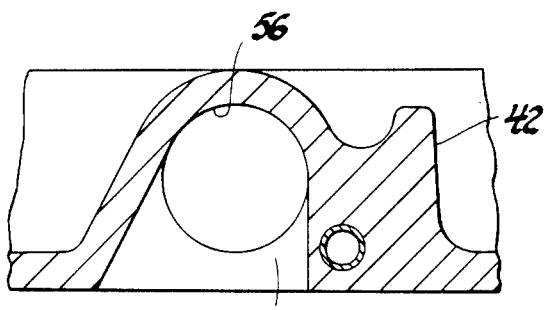
FIG. 6 is a transverse cross-sectional view from the plane indicated by the line 6—6 of FIG. 3 and showing the bypass passage connection with the blower outlet zone.
Figure 7:
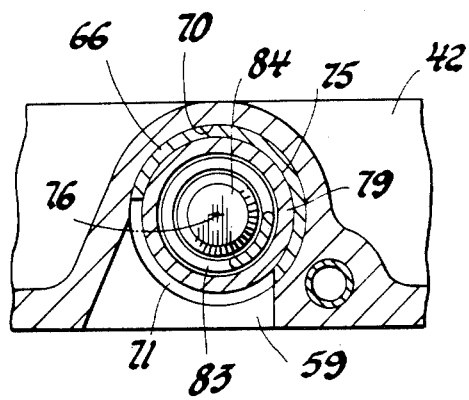
FIG. 7 is a transverse cross-sectional view from the plane indicated by the line 7—7 of FIG. 3 and showing the bypass valve and passage connection with the blower inlet zone.

Referring first to FIG. 1 of the drawings, numeral 10 generally indicates a schematic representation of a two-stroke cycle turbocharged and aftercooled two cycle diesel engine. Engine 10 includes means defining a plurality of cylinders 11 each having a piston 12 reciprocable therein. The pistons are operatively connected by connecting rods 14 with a crankshaft 15 rotatable upon reciprocation of the pistons during operation of the engine.

Surrounding the engine cylinders are means defining an airbox chamber 16 which connects to the various cylinders through inlet ports 18 formed in the cylinder walls and controlled by reciprocating movement of the piston. Exhaust ports 19 controlled by exhaust poppet valves 20 are also provided in closed ends 22 of the cylinders.

The engine exhaust system further includes a suitable manifold or conduit 23 connecting with the turbine 24 of an exhaust driven turbocharger 26. The turbine is directly connected with and drives a compressor 27 which forms a part of the engine intake air supply system.

The air supply system further includes a positive displacement Roots type blower 28 having an inlet 30 connected with the outlet of the turbocharger compressor. Blower 28 also has an outlet 31 which connects through the heat exchanger core of an aftercooler 32 with the engine airbox chamber 16 which comprises the cylinder charging air intake.

The Roots blower further includes a pair of mating impellers 34, 35 drivingly connected with the engine crankshaft through a suitable gear train not shown. A bypass passage 36 formed within the blower housing is opened or closed by a control valve 38 operable in response to blower outlet pressure in excess of ambient pressure as will be subsequently more fully described.

Referring now to FIGS. 2-7 of the drawings, there is illustrated a Roots type positive displacement blower having valve controlled bypass means formed in accordance with certain aspects of the invention. The blower, generally indicated by numeral 28, includes a housing comprising a central body 39 and front and rear end plates 40, 42 respectively. The housing defines an enclosed chamber 43 in which mating impellers 34, 35 are disposed for rotation on parallel longitudinal axes 44, 46 respectively.

The blower housing contains inlet openings 30 communicating with an inlet zone 48 within the chamber on one side of the plane 49 of the impeller axes. From the inlet zone 48 charging air is pumped by rotation of the mating impellers around the periphery of the chamber 43 to an outlet zone on the opposite side of the plane of the impeller axes and communicating with outlet openings 31 in the blower housing through which the pumped air may be discharged. Rotation of the mating impellers in close non-contacting relationship with each other and the chamber walls is provided for by crankshaft driven drive gear 52 and its mating timing gear 54 respectively connected with impellers 34, 35 through driveshafts 55 rotatably supported in the blower end plates 40, 42.

In accordance with the invention, the blower rear end plate 42 contains a bypass passage generally indicated by numeral 36 and extending between the inlet and outlet zones 48, 50 respectively of the blower. The bypass passage 36 includes a vertical bore 56 extending within the rear end plate from the upper edge 57 thereof between the spaced seal and bearing housings 58 that support the rotor driveshafts to a point near but short of the bottom edge of the end plate. Upper and lower bypass openings 59, 60 respectively, extend through the inner side 61 of the end plate wall and connect the vertical bore respectively with the inlet and outlet zones 48, 50 on opposite sides of the internal blower chamber 43.

The passage of air through the bypass passage 56, 59, 60 is controlled by a pressure responsive control valve 38 mounted on the upper edge 57 of the rear end plate 42 and extending into the vertical bore 56. The control valve 38 includes a tubular valve body 63 having upper and lower portions 64, 66 respectively extending oppositely from a flange 67 held by a retainer 68 in engagement with the upper edge 57 of the rear end plate.

The lower portion 66 of the valve body comprises a tubular cylinder extending within an enlarged portion 70 of the bore 36 to a point below the upper bypass opening 59. A cutout 71 in the wall of the cylindrical lower portion 66 provides communication from the upper bypass opening to the interior of the cylindrical portion 66. Below the cutout 71, the lower portion terminates with an end opening 72 surrounded by an internal annular valve seat 74.

The valve seat is engaged by the lower edge of a cup shaped plunger 75 reciprocably disposed for movement axially within the cylindrical lower portion of the valve body along the axis 76 thereof. Plunger 75 includes an end wall 78, transverse to axis 76 and closing the opening 72 when the plunger is seated on the valve seat 74. A cylindrical side wall 79 extends upwardly in slidably close fitting relation with the interior of the cylindrical portion 66 and parallel with the axis 76 to a point above the cutout 71 when the plunger is seated against the valve seat 74, thereby closing access through the upper bypass opening to the valve body interior. A seal ring 80 carried on the plunger above the cutout 71 prevents excessive leakage of pressurized charging air past the plunger into the valve body.

In the upper end of the valve body upper portion 64, a threaded plug 82 is threadably retained. A spring 83 seats against the plug 82 and extends downwardly within the valve plunger 75 to engage the end wall 78 and bias the plunger 75 toward its closed position on the valve seat 74. Plug 82 carries a downwardly extending spring guide and stop 84 which guides the spring movement and limits upward movement of the plunger. A vent opening 86 in the body upper portion 64 admits ambient air pressure to the interior of the valve body to act against the inner side of the control valve plunger 75. A seal ring 87 prevents leakage of charging air past the exterior of the valve body lower portion to atmosphere.

In operation the end wall 78 of the valve plunger is exposed to blower outlet pressure entering the bypass passage through the lower bypass opening 60. The force of this pressure is opposed by the force of the spring 83 and by the force of ambient pressure acting within the plunger by reason of the vent opening 86 in the valve body. Blower inlet pressure acts against the side wall 79 of the plunger when it is closed but has no effect upon the plunger's opening or closing bias, since the resulting force is perpendicular to the axis 76 along which the plunger reciprocates.

Accordingly, the control valve plunger 75 remains in its closed position until the pressure in the outlet zone of the blower rises to a predetermined level above ambient, at which time the blower plunger is opened. Preferably the lower edge of the plunger is formed with a slightly greater cone angle than that of the valve seat so that seating of the plunger occurs at the inner edge of the valve seat. Thus the area exposed to blower outlet pressure will be somewhat less when the valve is closed than when it is open. Accordingly, a lower blower outlet pressure will be required to maintain the valve open than is required to initially open it, providing inherent stability that avoids valve hunting or chatter at the opening pressure.

In engine operation, the blower is driven by the engine crankshaft to positively pump air from the turbocharger compressor into the engine airbox chamber from which it is delivered to the engine cylinders to be burned. Exhaust gases leaving the cylinders drive the turbine 24 which in turn drives the compressor to provide, when the exhaust energy is sufficient, increasingly pressurized air to the blower inlet.

When the engine speed is high relative to engine load, the positive displacement Roots blower may deliver an excessive amount of charging air to the engine airbox, increasing the charging pressure beyond that required. In this condition when the blower outlet pressure reaches a predetermined value, the bypass control valve will open allowing air flow to pass from the blower outlet to the blower inlet and maintaining the outlet pressure at the predetermined desired maximum value. Such bypassing of the blower in the described operating mode reduces the pressure differential across the blower and, therefore, reduces the power required to drive it, thereby increasing the engine power available for other purposes and improving its operating efficiency.

Under other operating circumstances when the load on the engine is high but the speed is relatively low, the engine turbocharger may provide a flow of intake air great enough to be restricted by the relatively slow moving rotors of the positive displacement blower. In such a case when the outlet pressure of the blower reaches a sufficiently high value, the bypass valve will open permitting charging air to bypass the blower impellers through the bypass passage 36 thereby admitting additional air into the engine cylinders and allowing for the efficient combustion of greater amounts of fuel as is desirable under the heavy load condition. Thus in this mode, the restriction of the Roots blower is bypassed by the bypass valve and passage means in accordance with the invention.

As should be apparent from the foregoing description, the present invention provides a single bypass valve and passage arrangement compactly fitted within the end plate of a Roots type blower which provides for the bypass of charging air around the blower impellers in either direction, depending upon flow conditions, the opening of the bypass valve being solely responsive to the level of blower outlet pressure in excess of ambient pressure and leading to the operating advantages indicated previously.

While the invention has been described by reference to a specific embodiment, it should be understood that numerous changes could be made without departing from the spirit and scope of the inventive concepts disclosed. For example, and without limitation, the bypass valve and passage arrangement described herein could be replaced by other suitable arrangements having attached or separate actuation devices or means solely or substantially solely responsive to blower outlet pressure for initiating or providing movement of the valve. Accordingly, it is intended that the invention not be limited to the described embodiment but that it have the full scope permitted by the language of the following claims.

I claim:

1. The combination of an intake air supply system with an internal combustion engine having a cylinder charging air intake and an exhaust discharge, said intake air supply system including
    an engine driven positive displacement blower having inlet and outlet means and an exhaust gas driven turbo-compressor connected in series whereby the compressor discharges to the blower inlet and the blower outlet discharges to the engine air intake,
    a bypass passage connecting the blower inlet and outlet,
    a pressure responsive control valve means in the bypass passage to control the flow of fluid through the bypass, and the improvement wherein said control valve means is operative to open and maintain open said bypass passage solely in response to the existence of predetermined superambient levels of pressure on the blower outlet side of the control valve means, whereby said control valve means permits bypass flow, substantially upon reaching or exceeding a predetermined blower discharge pressure, either (a) to recirculate air flow from the blower outlet to the inlet to reduce or limit the engine power absorbed by the blower or (b) to conduct additional air flow around the blower directly from the turbo-compressor to the engine intake to avoid the restriction of the blower to increased charging air flow, thereby providing a dual function capability in a single control valve means.

2. The combination of an intake air supply system with an internal combustion engine having a cylinder charging air intake and an exhaust discharge, said intake air supply system including
    an engine driven positive displacement blower having inlet and outlet means and an exhaust gas driven turbo-compressor connected in series whereby the compressor discharges to the blower inlet and the blower outlet discharges to the engine air intake,
    said blower having a housing rotatably supporting a pair of mating impellers in an enclosed chamber having inlet and outlet zones respectively connected with the compressor and the engine air intake and defined in part by an end plate at one end of the housing supporting adjacent ends of said impellers, and the improvement comprising
    a bypass passage through the end plate and connecting the blower inlet and outlet zones to bypass air around the impellers, and
    a pressure responsive control valve means in the bypass passage to control the flow of fluid through the bypass, said control valve means being operative to open and maintain open said bypass passage solely in response to predetermined superambient levels of pressure on the blower outlet side of the control valve means, whereby said control valve means permits bypass flow, substantially upon reaching of a predetermined blower discharge pressure, either (a) to recirculate air flow from the blower outlet to the inlet to reduce or limit the engine power absorbed by the blower or (b) to conduct additional air flow around the blower directly from the turbo-compressor to the engine intake to avoid the restriction of the blower to increased charging air flow, thereby providing a dual function capability in a single control valve means.

3. The combination with an internal combustion engine having an air intake of an air supply system comprising
    an exhaust driven turbo-compressor supplying air to the engine air intake and
    a Roots blower connected between the compressor and the air intake to supplement the supply of air thereto, said blower having
    a housing defining an enclosed chamber in which a pair of mating impellers are rotatable on parallel axes to positively displace fluids from an inlet zone on one side of the chamber to an outlet zone on the other side thereof,
    inlet and outlet openings into the housing at the inlet and outlet zones to respectively induct fluids to and discharge fluids from the chamber,
    the housing including an end plate closing one end of the chamber and lying in close proximity with adjacent ends of said impellers, said end plate partially defining said chamber including portions of both said inlet and outlet zones,
    a bypass passage in said end plate and extending between spaced openings to said inlet and outlet zones, said passage providing a bypass around the blower impellers, and
    a pressure responsive control valve mounted in said end plate and extending into said bypass passage to control fluid flow therethrough, said control valve comprising
    a valve seat in the passage between said passage openings, and
    a reciprocable plunger slidable on an axis and biased toward and seatable on said valve seat, said plunger having an end wall transverse to said axis and exposed to blower outlet pressure on the far side of said valve seat, said plunger further having a side wall parallel with said axis and exposed to blower inlet pressure on the near side of said valve seat, whereby said control valve is responsive solely to blower outlet pressure to open or close said bypass passage.

4. The combination of claim 1 wherein said control valve means comprises
    a valve seat in the passage between said inlet and outlet, and a reciprocable plunger slidable on an axis and biased toward and seatable on said valve seat, said plunger having an end wall transverse to said axis and exposed to blower outlet pressure on the far side of said valve seat, said plunger further having a side wall parallel with said axis and exposed to blower inlet pressure on the near side of said valve seat, whereby said control valve means is responsive solely to blower outlet pressure to open or close said bypass passage.

5. The combination of claim 2 wherein said control valve means comprises a valve seat in the passage between said inlet and outlet zones, and a reciprocable plunger slidable on an axis and biased toward and seatable on said valve seat, said plunger having an end wall transverse to said axis and exposed to blower outlet pressure on the far side of said valve seat, said plunger further having a side wall parallel with said axis and exposed to blower inlet pressure on the near side of said valve seat, whereby said control valve means is responsive solely to blower outlet pressure to open or close said bypass passage.

* * * * *